United States Patent
Evulet

(10) Patent No.: US 12,202,604 B2
(45) Date of Patent: Jan. 21, 2025

(54) VERTICAL TAKE OFF AND LANDING AIRCRAFT WITH FLUIDIC PROPULSION SYSTEM

(71) Applicant: Andrei Evulet, Edmonds, WA (US)

(72) Inventor: Andrei Evulet, Edmonds, WA (US)

(73) Assignee: Jetoptera, Inc., Edmonds, WA (US)

(*) Notice: Subject to any disclaimer, the term of this patent is extended or adjusted under 35 U.S.C. 154(b) by 0 days.

(21) Appl. No.: 17/241,549

(22) Filed: Apr. 27, 2021

(65) Prior Publication Data

US 2022/0009617 A1    Jan. 13, 2022

Related U.S. Application Data

(63) Continuation-in-part of application No. 16/748,560, filed on Jan. 21, 2020, now abandoned.

(60) Provisional application No. 63/016,226, filed on Apr. 27, 2020, provisional application No. 62/794,464, filed on Jan. 18, 2019.

(51) Int. Cl.
   *B64C 21/04*      (2023.01)
   *B64C 9/38*      (2006.01)
   *B64C 21/01*      (2023.01)

(52) U.S. Cl.
   CPC .............. *B64C 9/38* (2013.01); *B64C 21/01* (2023.01); *B64C 21/04* (2013.01)

(58) Field of Classification Search
   CPC ......... B64C 21/02; B64C 21/04; B64C 21/08; B64C 21/025
   See application file for complete search history.

(56) References Cited

U.S. PATENT DOCUMENTS

| | | | | |
|---|---|---|---|---|
| 1,888,452 A | | 11/1932 | Clark | |
| 2,464,663 A | | 3/1949 | Zingg | |
| 3,051,413 A | * | 8/1962 | Pouit | B64C 23/005 244/12.5 |
| 3,161,377 A | * | 12/1964 | Balluff | B64C 21/025 244/12.5 |
| 3,841,588 A | * | 10/1974 | Arnold | B64C 23/005 244/207 |
| 3,893,638 A | * | 7/1975 | Kelley | B64C 15/00 60/225 |
| 5,255,881 A | * | 10/1993 | Rao | B64C 21/04 244/199.1 |
| 7,823,840 B2 | * | 11/2010 | Shmilovich | B64C 21/04 244/215 |

(Continued)

FOREIGN PATENT DOCUMENTS

CN      102120491 A      7/2011

*Primary Examiner* — Tye William Abell
(74) *Attorney, Agent, or Firm* — Richard T. Black; FisherBroyles, LLP

(57) ABSTRACT

An aircraft includes a fuselage and a primary airfoil having a first upper surface. The first upper snake has a recess disposed therein. A conduit is in fluid communication with recess. An ejector is disposed within the recess. The ejector is configured to receive compressed air via the conduit. The ejector is further configured to produce a propulsive efflux stream. A secondary airfoil is coupled to the primary airfoil and has a second upper surface. The ejector is positioned such that the efflux stream flows over the second surface. The second surface is oriented so as to entrain the efflux stream to flow in a direction substantially perpendicular to the first upper surface.

12 Claims, 9 Drawing Sheets

(56) References Cited

U.S. PATENT DOCUMENTS

| | | | |
|---|---|---|---|
| 9,587,585 B1* | 3/2017 | Rolling | B64C 39/08 |
| 10,207,812 B2 | 2/2019 | Evulet | |
| 2016/0375986 A1* | 12/2016 | Shmilovich | B64C 21/04 |
| | | | 244/207 |
| 2017/0057648 A1* | 3/2017 | Evulet | B64C 23/00 |
| 2018/0370627 A1* | 12/2018 | Evulet | B64C 39/12 |
| 2020/0339247 A1 | 10/2020 | Evulet | |

\* cited by examiner

VERTICAL TAKE OFF AND LANDING AIRCRAFT WITH FLUIDIC PROPULSION SYSTEM

PRIORITY CLAIM

This application claims priority to U.S. Provisional Application No. 63/016,226, filed Apr. 27, 2020. This application is a continuation-in-part of U.S. application Ser. No. 16/748,560 filed Jan. 21, 2020, which claims the benefit of U.S. Provisional Application No. 62/794,464 filed Jan. 18, 2019, the contents of each application of which are hereby incorporated by reference in their entireties as if fully set forth herein.

COPYRIGHT NOTICE

This disclosure is protected under United States and International Copyright Laws. © 2021 Jetoptera. All rights reserved. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

The lift generated from an ordinary airfoil results from the airflow condition around the airfoil and lite geometry of said airfoil. By changing the speeds and the angle of attack and the surfaces such as flaps (surface changes) the lift of the airfoil can be controlled; the goal is to maximize lift generation with compact and light wings. Wings are in general growing larger for better efficiency and made of composites to keep the weight in check.

It is desired to minimize the weight of a wing and maximize the lift generation. It is desired to minimize the footprint and weight of a thrust generating device and maximize its output (thrust). This translates into minimization of fuel or energy consumption.

In most conventional aircraft, it is not currently possible to direct the jet efflux at an airfoil or wingfoil to utilize its lost energy. In the case of turbojets, the high temperature of the jet efflux actually precludes its use firs lift generation via an airfoil. Typical jet exhaust temperatures are 1000 degrees Centigrade and sometimes higher when post-combustion is utilized for thrust augmentation, as is true for most military aircraft. When turbofans are used, in spite of the usage of high by-pass on modem aircraft, a significant non-axial direction residual element still exists, due to the fan rotation, in spite of vanes that direct the fan and core exhaust fluids mostly axially. The presence of the core hot gases at very high temperatures and the residual rotational movement of the emerging mixture, in addition to the cylindrical nature of the jets in the downwash, make the use of airfoils directly placed behind the turbofan engine impractical. In addition, the mixing length of hot and cold streams from the jet engines such as turbofans is occurring in miles, not inches. On the other hand, the current use of larger turboprops generates large downwash cylindrical airflows the size of the propeller diameters, with a higher degree of rotational component velocities behind the propeller and moving large amounts of air at lower speeds. The rotational component makes it difficult to utilize the downstream kinetic energy for other purposes other than propulsion, and hence, part of the kinetic energy is lost and not efficiently utilized. Some of the air moved by the large propellers is also directed to the core of the engine. In summary, the jet efflux from current propulsion systems has residual energy and potential not currently exploited.

BRIEF DESCRIPTION OF THE DRAWING FIGURES

Preferred and alternative embodiments of the present invention are described in detail below with reference to the following drawings:

FIG. 1. illustrates a top perspective view of an aircraft according to an embodiment;

DETAILED DESCRIPTION

Figure 1:
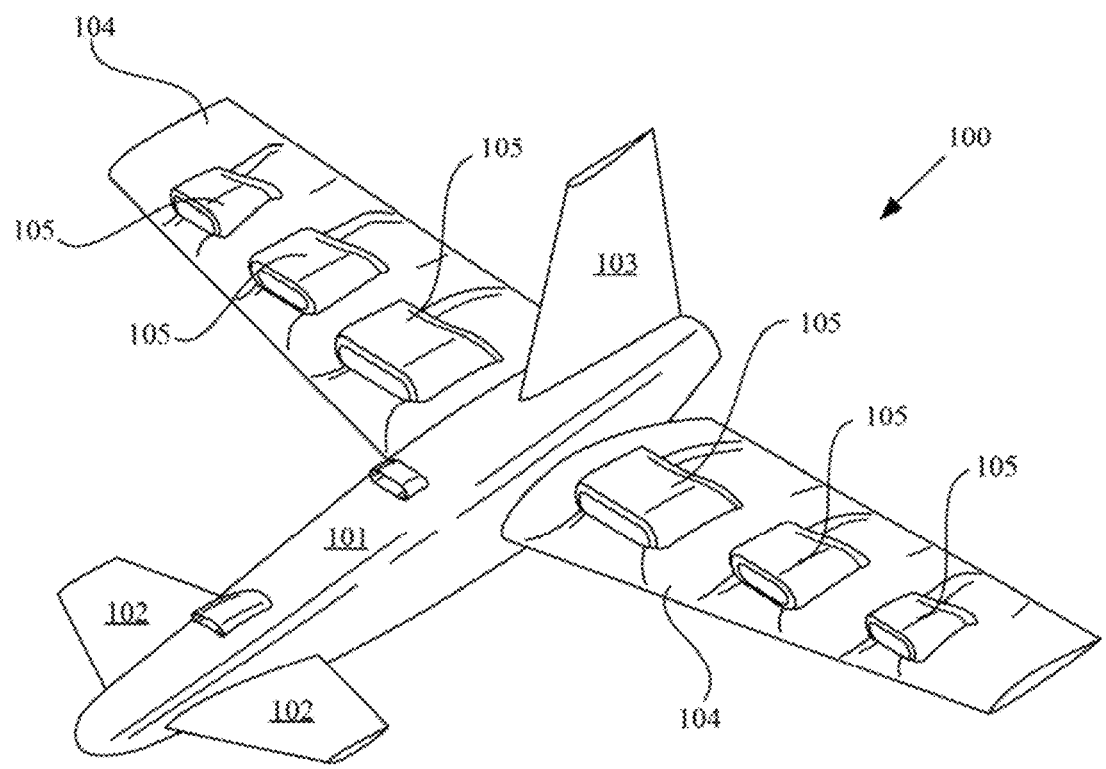

This application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms. In addition, the headings in this application are for reference purposes only and shall not in any way affect the meaning or interpretation of the present invention.

An embodiment combines features that augment both thrust and lift by embedding thrusters/ejectors in a lift generating device such as a wing or other aerodynamic surface. Such ejectors may be embedded on, for example, the top surface of the wing.

The thrust augmentation device that may be called an ejector, described in, for example U.S. patent application Ser. No. 15/256,178, which is hereby incorporated by reference as if fully set forth herein, uses a pressurized fluid flow, such as compressed air, which otherwise may produce a certain amount of thrust by expansion to atmospheric conditions (entitlement thrust) but via entrainment of ambient air and energy transfer, generates more thrust and therefore augments the entitlement thrust. The ejector can be made non-round in shape, and given shapes that are similar to the upper surface of airfoils, which makes it easy to embed into said airfoil.

The fluidic propulsive system (FPS) thruster/ejector may be attached to a vehicle (not shown), such as, for non-limiting, example, a UAV or a manned aerial vehicle such as an airplane. A plenum is supplied with hotter-than-ambient air (i.e., a pressurized motive gas, stream) from, for example, a combustion-based engine that may be employed by the vehicle. This pressurized motive gas stream is introduced via at least one conduit, such as primary nozzles, to the interior of the ejector. More specifically, the primary nozzles are configured to accelerate the motive fluid stream to a variable predetermined desired velocity directly over a convex Coanda surface as a wall jet. Additionally, primary nozzles provide adjustable volumes of fluid stream. This wall jet, in turn, serves to entrain through an intake structure secondary fluid, such as ambient air, that may be at rest or approaching the ejector at non-zero speed. In various embodiments, the nozzles may be arranged in an array and in a curved orientation, a spiraled orientation, and/or a zigzagged orientation.

The mix of the stream and the air may be moving purely axially at a throat section of the ejector. Through diffusion in a diffusing structure, such as diffuser, the mixing and smoothing out process continues so the profiles of temperature and velocity in the axial direction of ejector no longer have the high and low values present at the throat section, but become more uniform at the terminal end of diffuser. As the mixture of the stream and the air approaches the exit plane of terminal end, the temperature and velocity profiles are almost uniform. In particular, the temperature of the mixture is low enough to be directed towards an airfoil such as a wing or control surface.

In an embodiment, intake structure and/or terminal end may be circular in configuration. However, in varying embodiments, intake structure, as well as terminal end, can be non-circular and, indeed, asymmetrical (i.e., not identical on both sides of at least one, or alternatively any-given, plane bisecting the intake structure). For example, the intake structure can include first and second lateral opposing edges wherein the first lateral opposing edge has a greater radius of curvature than the second lateral opposing edge. The terminal end may be similarly configured.

An embodiment of the present invention combines the two elements. It brings together a thrust augmentation of, for example, 2.0, with a lift augmentation and enables the airfoil to have aggressive angles of attack without stall, at least 1.5 times lift enhancement achieved through the combination of boundary layer ingestion and blown jet surface. The combination can enable STOL and maneuverability of aircraft beyond current capabilities of separate systems.

In an embodiment of the present invention, the stream emitted by the ejector can be used for lift generation by directing it straight to a thin airfoil (e.g., a trailing edge surface of the wing disposed aft of the exit plane of the ejector) for lift generation. For example, where an ejector efflux axial velocity is 125% greater than the aircraft airspeed, the portion of the wing receiving the jet efflux stream can generate more than 50% higher lift for the same wingspan compared to the case where the wingspan is solely washed by the airspeed of the aircraft air. Using this example, if the ejector efflux velocity is increased to 150%, the lift becomes more than 45% higher than the original wing at aircraft airspeed, including a density drop effect if a pressurized exhaust gas from a turbine was used, for instance.

Figure 2:
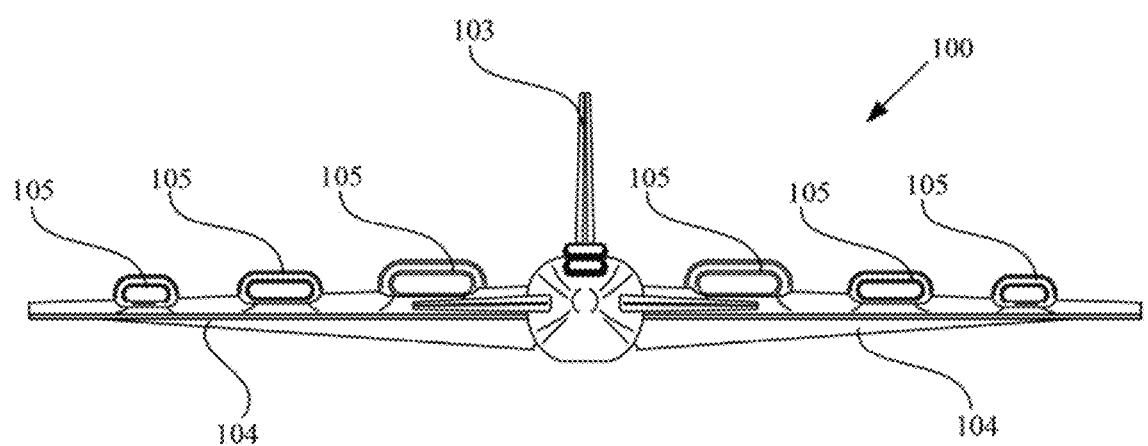
FIG. 2 is a front plan view of the aircraft illustrated in FIG. 1.

FIGS. 1 and 2 illustrate an aircraft 100 according to an embodiment of the invention. Aircraft 100 includes a fuselage 101 to which are attached forward canard wings 102 and tail fin 103. Aircraft 100 further includes a pair of primary wings 104 attached to the fuselage 101 and in which are embedded ejectors 105. In the illustrated embodiment, the size of each ejector 105 is progressively smaller as they are positioned from the fuselage 101 to the tips of wings 104.

Figure 3:
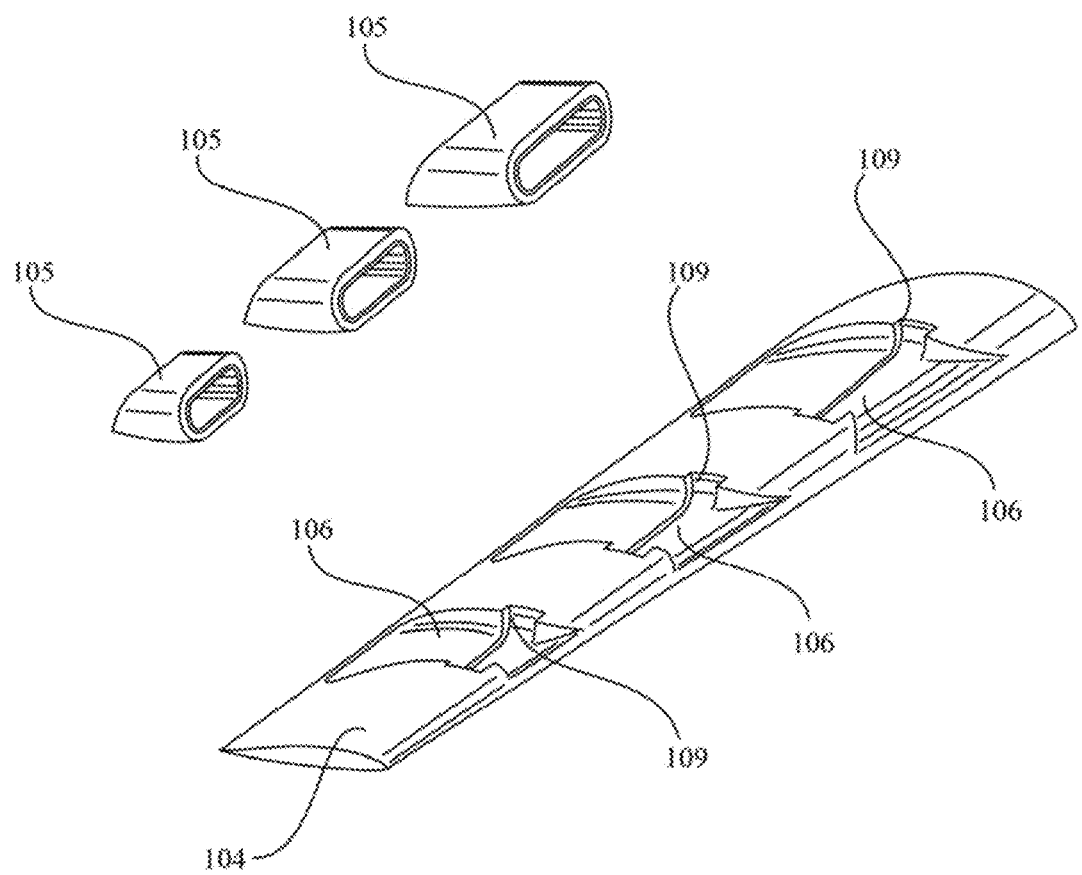
FIG. 3 illustrates in exploded view of a wing and ejector assembly of the aircraft illustrated in FIG. 1.
Figure 4:
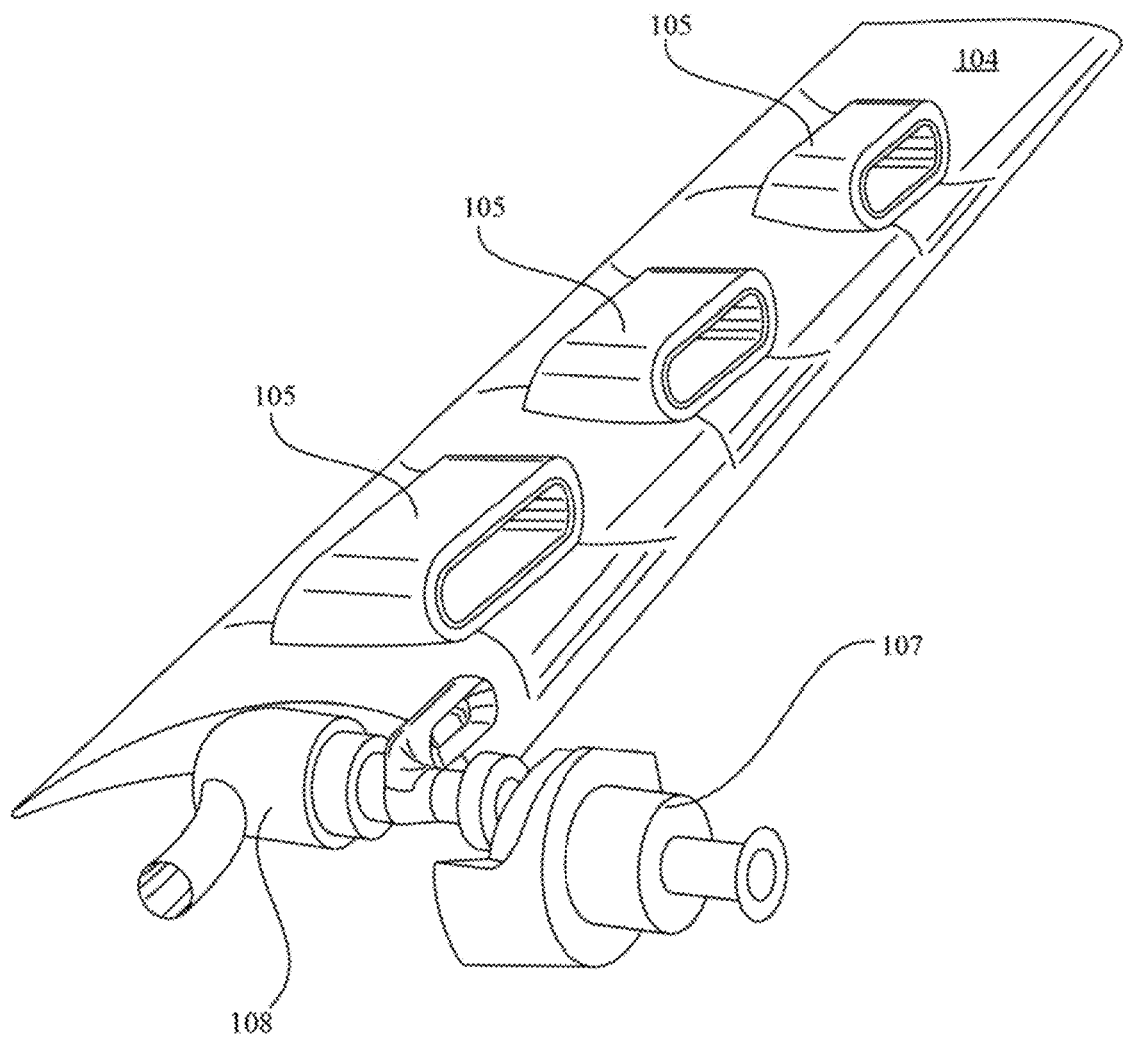
FIG. 4 illustrates a top partial cross-sectional perspective view of the wing and ejector assembly of the aircraft illustrated in FIG. 1 including a turbine and compressor assembly.

As best illustrated in FIG. 3, wings 104 include recesses 106 configured to receive and accommodate ejectors 105 as well as serve as aerodynamic surfaces fore and aft of each ejector. Referring to FIG. 4, aircraft 100 may further include a gas turbine 107 and compressor 108 that distributes compressed air throughout the interior of the wing 104 and to the ejectors 105 via conduits 109, which are illustrated in FIG. 3.

As a result of this configuration, at least one embodiment of the invention provides a lift and thrust augmentation device, combining a lift generating surface 104 approximately shaped like an airfoil of very aggressive aerodynamic geometry, with ejectors 105 using a source of pressurized fluid such as, for example, air of exhaust gas. The ejectors 105 are geometrically and functionally shaped to conform to said lift generating device such that the combination thereof generates more lift and thrust than the separate airfoil shaped device 104 and ejectors separately.

In such an embodiment, the inlets of the ejectors 105 are optimally placed and distributed along the span on the upper surface of the wing 104 to allow the boundary layer ingestion formed on the leading edge of and streamwise along the wing upper surface to eliminate boundary layer separation and therefore delay or eliminate stall to increased angles of attack.

In such an embodiment, the outlets of the ejectors 105 are optimally placed and distributed along the span on the upper surface of the wing 104 to allow the boundary layer to be energized and ejected as wall jets streamwise along the wing's upper surface to control the lift generation of the upper surface of the wing.

In such an embodiment, a pressurized fluid is supplied through the wing 104 to the ejectors 105 in a fluid network that allows modulation and shut-off of each of the ejectors individually, hence distributing not only thrust but also lift where needed, when needed.

Alternatively, a wing such as a light wingfoil could be deployed directly behind the ejector exit plane, immediately after the vehicle has completed the take-off maneuvers and is transitioning to the level flight, helping generate more lift for less power from the engine.

Alternatively, using this embodiment of the present invention, the wing need not be as long in wingspan, and for the same cord, the wingspan can be reduced by more than 40% to generate the same lift. In this lift L equation (Eq. 1) known by those familiar with the art:

$$L = \tfrac{1}{2}\rho V 2 S C L \qquad \text{Eq. 1}$$

where S is the surface area of the wing, $\rho$ is the density, V is the velocity of the aircraft (wing), and CL is the lift coefficient. A UAV with a wingspan of e.g., 10 ft. can reduce the wingspan to merely 6 ft. provided the jet is oriented directly to the wing at all times during level flight, with a wing that is thin and has a chord, camber and CL similar to the original wing. The detrimental impact of temperature on the density is much smaller, if the mixing ratio (or entrainment ratio) is large, and hence the jet is only slightly higher in temperature.

Figure 5:
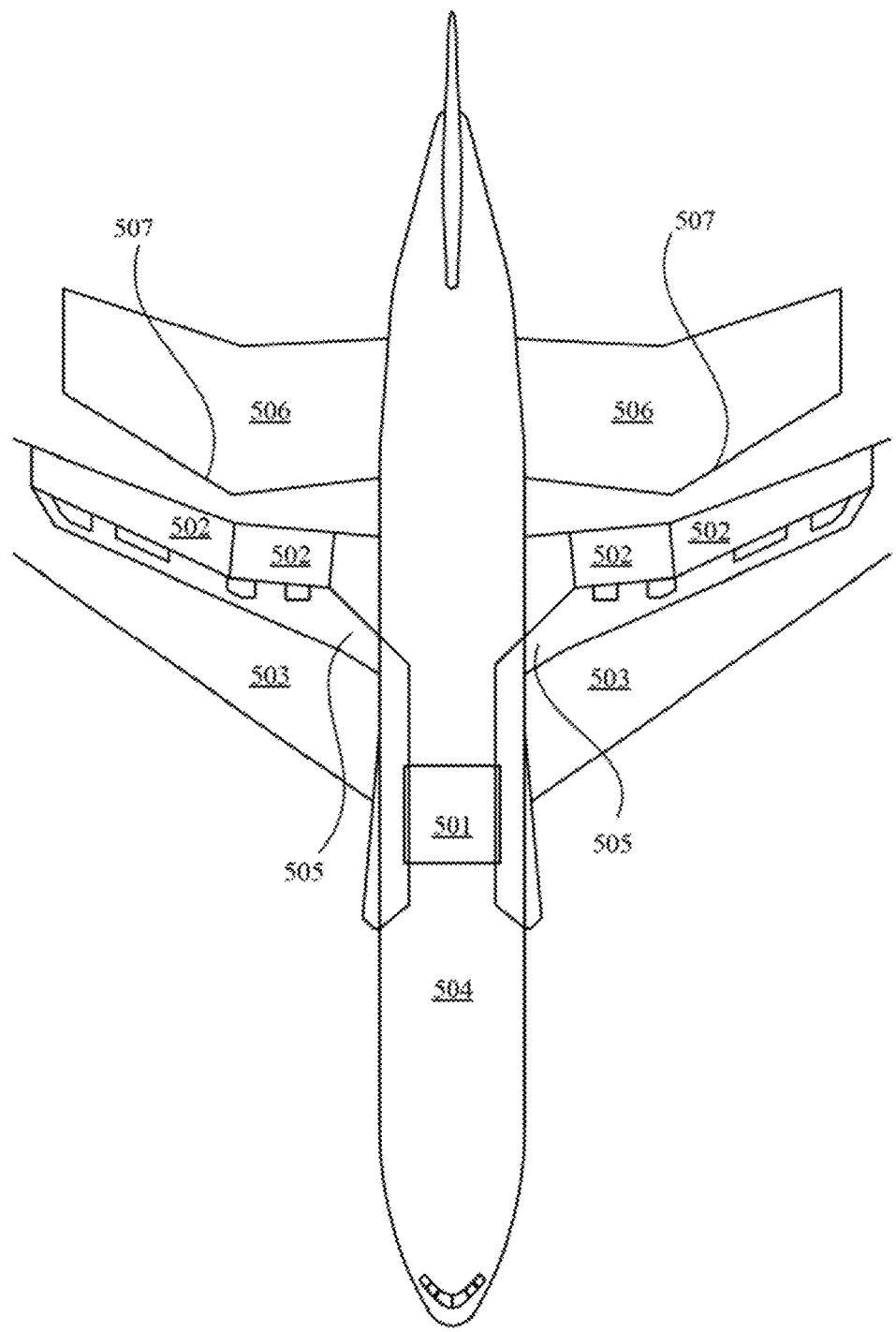
FIG. 5 illustrates a top plan view of an aircraft according to an alternative embodiment.

FIG. 5 illustrates an embodiment that provides an alternative to the traditional approach of placing jet engines on the wings of an aircraft to produce thrust. In FIG. 5, a gas generator 501 produces a stream of motive air for powering a series of ejectors 502 that are embedded in the primary airfoils, such as wings 503, for forward propulsion by emitting the gas stream directly from the trailing edge of the primary airfoils. In this embodiment, the gas generator 501 is embedded into the main-body fuselage 504 of the aircraft, is fluidly coupled to the ejectors 502 via conduits 505 and is the sole means of propulsion of the aircraft. Ejectors 502 may be circular or non-circular, have correspondingly shaped outlet structure similar to terminal end 101 and provide, at a predetermined adjustable velocity, the gas stream from generator 501 and conduits 505. Additionally, ejectors 502 may be movable in a manner similar to that of flaps or ailerons, rotatable through a 180° angle and can be actuated to control the attitude of the aircraft in addition to providing the required thrust. Secondary airfoils 506 having leading edges 507 are placed in tandem with wings 503 and directly behind ejectors 502 such that the gas stream from the ejectors 502 flows over the secondary airfoils 506. The secondary airfoils 506 hence receive a much higher velocity than the airspeed of the aircraft, and as such creates a high lift three, as the latter is proportional to the airspeed squared. The entirety of the secondary airfoils 506 may be rotatable about an axis oriented parallel to the leading edges 507.

In this embodiment of the present invention, the secondary airfoil 506 will see a moderately higher temperature due to mixing of the motive fluid produced by the gas generator 501 (also referred to as the primary fluid) and the secondary fluid, which is ambient air, entrained by the motive fluid at a rate between 5-25 pans of secondary fluid per each primary fluid part. As such, the temperature that the secondary airfoil 506 sees is a little higher than the ambient temperature, but significantly lower than the motive fluid, allowing for the materials of the secondary wing to support and sustain the lift loads, according to the formula: Tmix=(Tmotive+ER*Tamb)/(1+ER) where Tmix is the final fluid mixture temperature of the jet efflux emerging from the ejector 502, ER is the entrainment rate of parts of ambient air entrained per part of motive air, Tmotive is the hotter temperature of the motive or primary fluid, and Tamb is the approaching; ambient air temperature.

Figure 6:
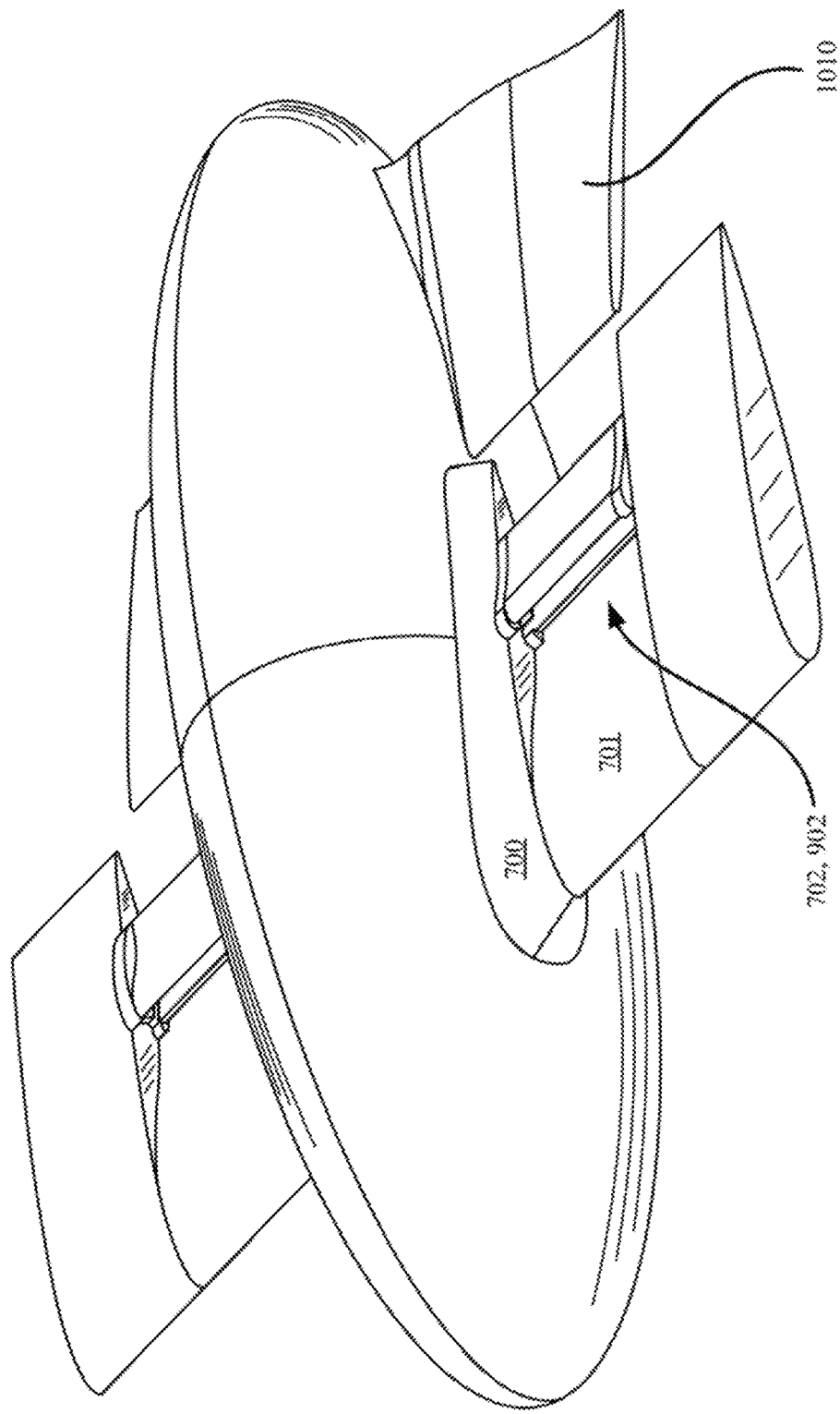
FIG. 6 illustrates a top perspective view of an aircraft according to another alternative embodiment.

FIG. 6 depicts an alternative embodiment of the present invention featuring tandem wings. In the illustrated embodiment, a secondary airfoil 1010 is placed directly downstream of the augmenting airfoils 702, 902 such that the fluid flowing over the primary airfoil 701 and the gas stream from the augmenting airfoils flows over the secondary airfoil. The combination of the two relatively shorter wings 701, 1010 produce more lift than that of a much larger-spanned wing lacking the augmenting airfoils 702, 902 and that rely on a jet engine attached to a larger wing to produce thrust.

Figure 7:
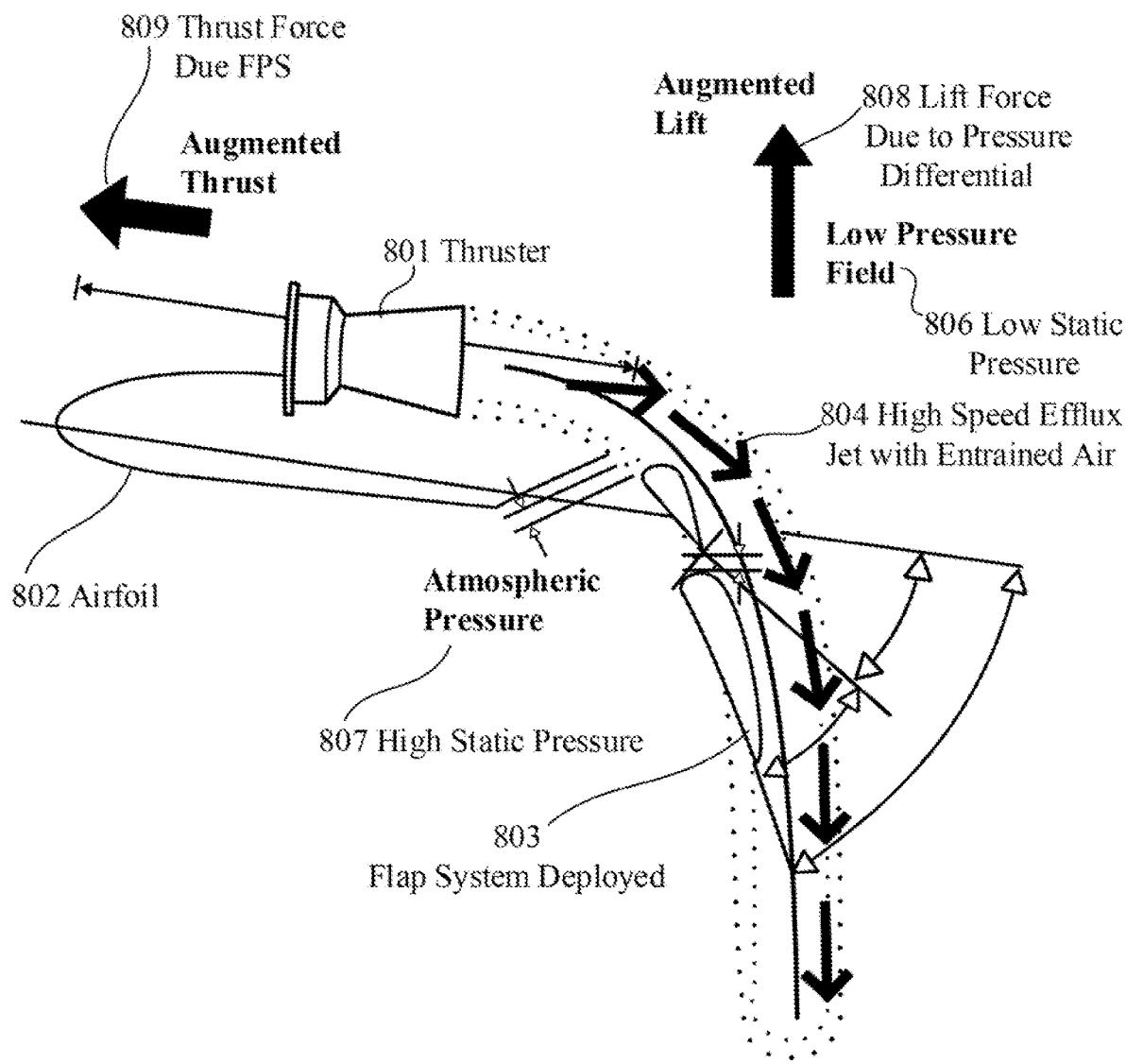
FIGS. 7-9 illustrate an alternative embodiment of the invention.
Figure 8:
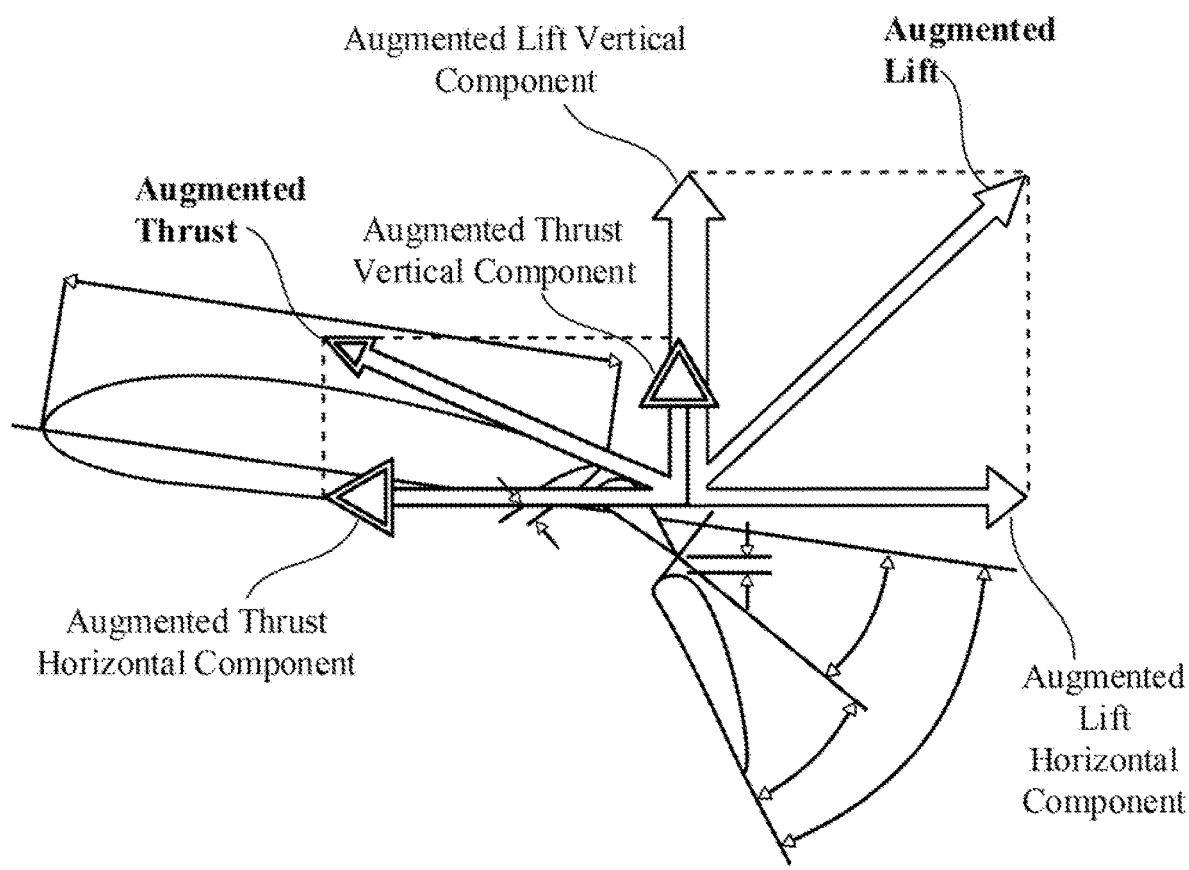
Figure 9:
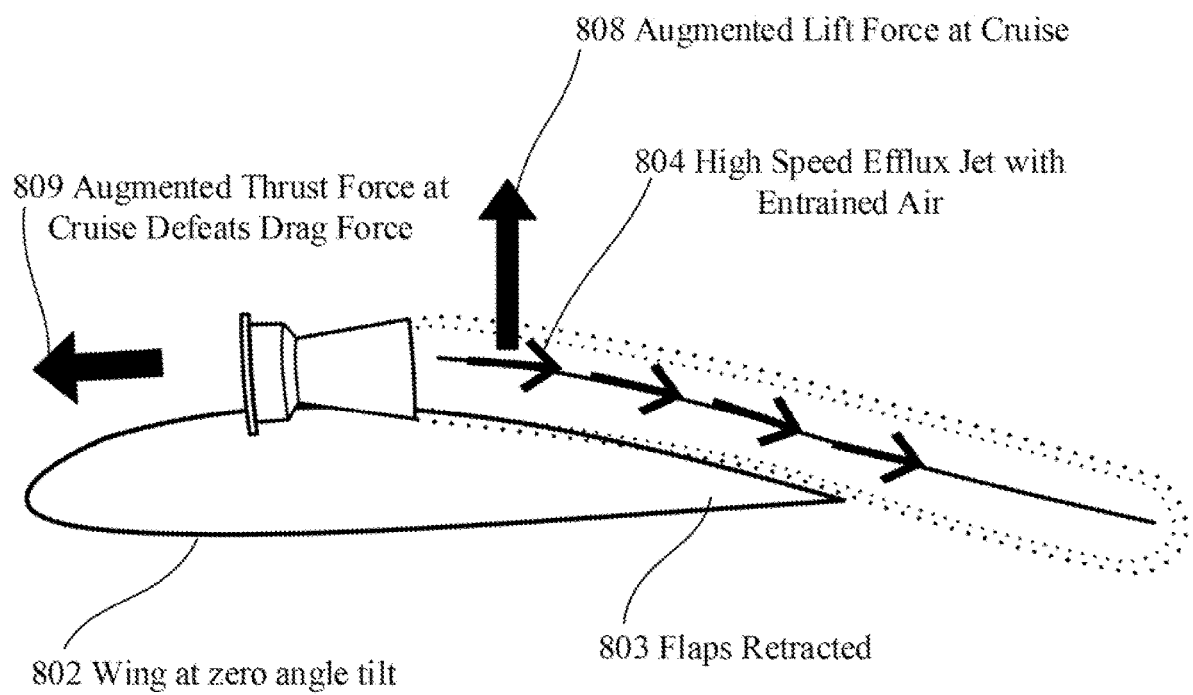

Referring to FIGS. 7-9, an aircraft powered by an FPS according to an embodiment is utilized in a distributed manner across large portions of the wing (primary airfoil) 802 of an aircraft in a manner similar to that described above herein. The wing of the aircraft can tilt, and has secondary airfoils 803 such as vanes slats, flaps and other lift generating surfaces that can augment the lift at stationary conditions such as take☐off, landing or hovering with a factor greater than 1 and preferably two times or more lift generated than the value the baseline wing may produce in flight.

The wing 802 of the aircraft is constructed to work with the suction portion of the ejectors/thrusters 801 of an FPS and the efflux of said FPS thrusters via mechanisms of Boundary Layer Ingestion (BLI) and Upper Surface Blown Jet over large portions of the aircraft, preferably larger than 25% of the total surface of the wing and up to 100% of the entire wing surface.

The fronts of the thrusters 801 of the FPS in an embodiment and such as are described above herein are designed to entrain at least live parts of ambient air for each part of compressed air or gas (motive fluid) supplied to them via local low-pressure fields generated in proximity to the inlets. This portion may be combined with aggressive slats that allow for aggressive angles of attack of the wing that allow for additional lift generation. The efflux (rear) ends of the thrusters may produce a nearly unidirectional jet stream 804 consisting of, for example, one pan motive fluid and five parts entrained air to an efflux velocity of a minimum 100 mph and preferably larger, depending on the entertainment ratio. The resulting jet is directed in the shape of a wall jet adjacent to the upper surface of the wing in such a manner that the flow is never separated. The wing may contain flaps extendable to increase the surface exposed to said efflux jet by at least one half but preferably full chord length of the baseline wing via one or several flaps, such as are known in the art.

The combination of the fully extended slats, flaps and thrusters produce a resulting lift/thrust generation 808, 809 many times larger than the stand☐alone thrusters and flaps. The efflux jet being deployed ONLY on the suction side of the wing OPTIMIZES and MAXIMIZES the lift generated in static conditions, via a significant drop in the static pressure while increasing dramatically the dynamic pressure above the wing. As compared to the propeller blown wing, no residual rotational flows result and the much higher velocities of the efflux jet ensure much higher chops in the static pressure above the wing.

The lower static pressure on the suction side 806 of the wing may be completely separated from the low or zero velocity on the pressure side 807 of the wing (below the wing) with the extended flaps and slats forming a border between the areas of high static pressure (below) and low static pressure (above) the wing, with the wing being a surface now producing a lift and thrust combination at static conditions that may result in many times the value of the thrust itself. A factor of at least two times the thrust of the FPS thruster is expected, increasing with the velocity of said efflux jet, surface area of the flaps and slats. For instance, a thruster producing 500 N of thrust may have a velocity of the efflux of 100 m/s for a combined flow (entrained plus motive air) of 5 kg/s (for an entrainment of 10:1 obtained using a motive fluid mass flow rate of 0.45 kg/s) with an Augmentation Ratio of the thruster of 500 N/172 N=2.9; where a compressed air flowrate of 0.45 kg/s of motive fluid, in choked conditions and expanded to ambient on an iso☐day produces 172 N when expanded to 378 m/s. The directed 100 m/s air emerging from said thruster as wall jet, adjacently blowing over a 0.25 m^2 fully expanded flap will generate roughly an averaged 75 m/s air at a density of 1.125 kg/s generating a dynamic pressure of ½*RHO*V^2 of where RHO is the density, V is the average velocity as known in the an of 3164 N/m^2, resulting in a static pressure drop to 101325 N/m^2−3164 N/m^2=98161 N/m^2 by using the Bernoulli relation; which in turn, when comparing with the static pressure on the pressure side of the wing which is 101325 N/m^2 on an☐iso day at sea level, hence resulting in a force of roughly 3164 N/m^2*0.25 m^2=791 N, which is even larger than the 500 N produced by the thruster by a factor of 1.58.

The combination discussed above results in a force as a combination of two vectors—the thruster produces thrust force, and the lift produced by the efflux and wing/flaps area may not point purely vertically at which point the wing is tilted to orient the resulting force mainly upwards. For example the resulting 500 N thrust from 20 deg angle above the horizontal plane may produce a vertical component of 500N*SIN(20 deg)=171 N which may be combined with a total lift force of 791 N pointing 36.45 degrees all from the vertical (to balance the 469 N forward pointing thrust component on the horizontal axis) and resulting in a vertical component of said lift of 791*COS(36.45) N=636.3 N for a total vertical component of 807 N. If a simple thruster were pointing upwards for VTOL, without the use of a blown wing area, the thrust produced would only be 500 N. In this manner, a factor of 807/500=1.615 was obtained, resulting in a 61.5% more lift at take-off while the horizontal components are balanced (thruster horizontal component is 469 N pointing forward while the wing horizontal contribution is 469 N pointing rearwards).

In this case, by combining the effects of a smaller-propulsion-system high-momentum efflux (high speed, massive air entrainment and wall jet deployment) capable of only producing, for example, 500 N at sea level on an iso-day on its own, with the larger surface area of a flaps and wing, which has a favorable curvature to discourage the flow separation of the said efflux produced, a significant pressure differential between the suction side and the pressure side of the wing is generated and the wing is pushed from high to low pressure to generate 61.5% more force for takeoff.

Once transitioned in the wingborne operation and gaining forward speed, a smooth transition is possible and with flaps retracted the maximum thrust generated reverts to e.g., 300 N, which for a 250 kg MTO aircraft may be sufficient for high-speed propulsion while still adjusting lift generation with the help of thruster efflux, thrust production and flap angles, to adjust to the required speeds and attitudes of the aircraft.

A similar, reverse operation can be envisioned in a transition from high speed to hover and eventually landing by operating concomitantly the FPS thruster (via turbocompressor speed, and flow controls), the flaps angles and, optionally, the wing tilt angle, and hence being able to slow down and vertically land.

Referring to FIG. 7, VTOL Configuration at takeoff shows the balance of forces generated by the airfoil 802 in conjunction with thruster 801. The thrust 809 pushes the airplane forward and produces an efflux stream 804 that follows the deployed flap system 803 contour as indicated by the arrows. The stream 804 has, in an embodiment, at least 100 m/s at the beginning but turns down over the flaps system 803 and slows down in the process for an overall average of 75 m/s. This creates a dynamic pressure and by Bernoulli rule it drops the static pressure 806 above the wing to much lower levels than the counterpart under the wing, 807. The pressure differential across the large airfoil area is generating lift even at static conditions when the aircraft is not moving. The airfoil 802 embedded with thruster 801 has been discussed above herein. The entire structure of the wing 802 can tilt by as much as 90 degrees to the vertical.

Referring to FIGS. 7 and 8, and in an embodiment, the efflux 804 produces a net thrust force 809 of 500 Newton static oriented at, e.g., 20 deg up, with horizontal component forward and a vertical component 171 Newton that contributes together with the vertical component of the lift generated of a value 636.3 Newton to a total vertical component of 807.6 Newton. The horizontal components of the thrust and lift balance each other being equal in value at 469 Newton and opposite in direction.

Referring to FIG. 9, the retracted flaps 803 are in cruise condition, where the efflux 804 is producing both augmented thrust 809 to defeat drag and enough velocity over the smaller wing with retracted flaps to augment lift 808. The wing 802 is now back to zero-degree tilt.

An embodiment has VTOL and hover capability with, optionally, a partial wing tilt of, for example, 15 degrees and fluidic propulsive system feeding wing integrated thrusters and has at least the following features:

Allows for a rapid takeoff and landing with a smooth and efficient transition.

Allows for an optional small change in wing tilt between hover and forward flight, minimum power and control changes.

Typical fixed wing needs approximately half (½) the aircraft weight in thrust and will have a high speed conventional take off.

Helicopter needs almost 1.4 times the thrust for VTOL operations, resulting in much larger powerplant needs which are inefficient at cruise conditions.

As compared with a Harrier jumpjet aircraft or F35 fighter jet, known in the art for being VTOL capable, the powerplant requirement is significantly lower, resulting in a smaller powerplant of any type and allowing the overall performance to increase in range, speed, eliminate rotors and propellers.

The following advantages emerge from the one or more embodiments described herein:

A fluidic system that produces a large amount of entrained flow at high speeds and thrust based on a small amount of compressed fluid and expels said entrained and compressed fluid largely unidirectionally at uniform velocity, in shape of a wall jet over a curvilinear surface, in order to produce both thrust and a low static pressure zone immediately above the curvilinear surface;

A curvilinear surface that may extend significantly to increase the area washed by the efflux jet without separation of the boundary layer formed and over a large wingspan of a wing;

An optional tilting system that includes the airfoils and/or ejectors rotating together around an axis;

The above-described combined systems deployed to a VTOL or STOL aircraft such that they increase the lifting force;

The above-described combined systems deployed to an automobile such that they increase the downforce to keep the automobile on the ground at high speeds.

Although the foregoing text sets forth a detailed description of numerous different embodiments, it should be understood that the scope of protection is defined by the words of the claims to follow. The detailed description is to be construed as exemplary only and does not describe every possible embodiment because describing every possible embodiment would be impractical, if not impossible. Numerous alternative embodiments could be implemented, using either current technology technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:
1. An aircraft, comprising:
a fuselage;
at least one primary airfoil including a first upper surface having at least one recess disposed therein;
at least one conduit in fluid communication with the at least one recess;
at least one ejector embedded in the at least one recess, having at least one intake structure configured to receive a secondary fluid, configured to receive compressed air via the at least one conduit, and configured to produce a propulsive efflux stream in response to the secondary fluid and the compressed air; and at least one secondary airfoil directly coupled to the at least one primary airfoil and having a second upper surface, the at least one ejector being positioned such that the efflux stream flows over the second upper surface, the second upper surface being oriented so as to entrain the efflux stream to flow in a direction substantially perpendicular to the first upper surface, wherein the primary airfoil connects to the secondary airfoil to form an airfoil element, the secondary airfoil configured to extend from the primary airfoil into a deployed position from a cruise condition and wherein the length of the airfoil element is longer in the deployed position than in the cruise condition.

2. The aircraft of claim 1, wherein:
the secondary fluid includes boundary layer air formed on a leading edge of the at least one primary airfoil; and
the at least one intake structure includes an inlet positioned on the first upper surface to enable ingestion of the secondary fluid.

3. The aircraft of claim 1, further comprising a canard wing coupled to the fuselage and positioned forward along the fuselage relative to the at least one primary airfoil.

4. The aircraft of claim 1, wherein the at least one recess comprises aerodynamic surfaces fore and aft of the at least one ejector.

5. The aircraft of claim 1, further comprising a source of the compressed air disposed in the fuselage.

6. The aircraft of claim 5, wherein the fluid produced by the source is the sole means of propulsion of the aircraft.

7. An aircraft, comprising:
a fuselage;
at least one primary airfoil including a first upper surface having at least one recess disposed therein;
at least one conduit in fluid communication with the at least one recess;
at least one ejector embedded in the at least one recess, having at least one intake structure configured to receive a secondary fluid, configured to receive compressed air via the at least one conduit, and configured to produce a propulsive efflux stream from the secondary fluid and the compressed air; and at least one secondary airfoil directly coupled to the at least one primary airfoil and having a second upper surface, the at least one ejector being positioned such that the efflux stream flows over the first and second upper surfaces, the second upper surface being oriented so as to entrain the efflux stream to flow in a direction substantially perpendicular to the first upper surface, wherein the primary airfoil connects to the secondary airfoil to form an airfoil element, the secondary airfoil configured to extend from the primary airfoil into a deployed position from a cruise condition, wherein the length of the airfoil element is longer in the deployed position than in the cruise condition, and wherein the at least one ejector is embedded in the at least one recess upstream of a location at which the primary airfoil connects to the secondary airfoil.

8. The aircraft of claim 7, wherein,
the secondary fluid includes boundary layer air formed on a leading edge of the at least one primary airfoil; and
the at least one intake structure includes an inlet positioned on the first upper surface to enable ingestion of the secondary fluid.

9. The aircraft of claim 7, further comprising a canard wing coupled to the fuselage and positioned forward along the fuselage relative to the at least one primary airfoil.

10. The aircraft of claim 7, wherein the at least one recess comprises aerodynamic surfaces fore and aft of the at least one ejector.

11. The aircraft of claim 7, further comprising a source of the compressed air disposed in the fuselage.

12. The aircraft of claim 11, wherein the fluid produced by the source is the sole means of propulsion of the aircraft.

* * * * *